United States Patent
Zhao et al.

(10) Patent No.: US 10,812,797 B2
(45) Date of Patent: Oct. 20, 2020

(54) METHOD, APPARATUS AND MEDIUM FOR DECODING OR ENCODING USING A LOW-COMPLEXITY TRANSFORM

(71) Applicant: TENCENT AMERICA LLC, Palo Alto, CA (US)

(72) Inventors: Xin Zhao, San Diego, CA (US); Xiang Li, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/235,395

(22) Filed: Dec. 28, 2018

(65) Prior Publication Data

US 2019/0246142 A1 Aug. 8, 2019

Related U.S. Application Data

(60) Provisional application No. 62/626,539, filed on Feb. 5, 2018.

(51) Int. Cl.
*H04N 19/122* (2014.01)
*H04N 19/176* (2014.01)
(Continued)

(52) U.S. Cl.
CPC ......... *H04N 19/122* (2014.11); *H04N 19/176* (2014.11); *H04N 19/61* (2014.11); *H04N 19/625* (2014.11); *H04N 19/96* (2014.11)

(58) Field of Classification Search
None
See application file for complete search history.

(56) References Cited

U.S. PATENT DOCUMENTS 5,128,756 A * 7/1992 Johnston ............... H04N 19/50
348/607
6,980,596 B2 * 12/2005 Wang ................... H04N 19/105
375/240.12
(Continued)

OTHER PUBLICATIONS

Jianle Chen, et al., "Algorithm Description of Joint Exploration Test Model 7 (JEM 7)", Joint Video Exploration Team (JVET) of ITU-T SG16 WP3 and ISO/IEC JTC1/SC29/WG11, JVET-G1001, 7th Meeting: Torino, IT, Jul. 13-21, 2017, 51 pages.
(Continued)

*Primary Examiner* — Tyler W. Sullivan
(74) *Attorney, Agent, or Firm* — Sughrue Mion, PLLC

(57) ABSTRACT

A method of encoding or decoding utilizing a low complexity transform may include receiving information regarding a target block for encoding or decoding, and if the at least one of a width or a height of a block size of the target block is greater than or equal to the predetermined threshold, performing encoding or decoding of the target block, but instead of applying a large transform having a size corresponding to the at least one of the width or the height of the block size of the target block, applying a first transform to a first portion of the target block, and applying the first transform or a second transform to a second portion of the target block. Also, at least one of the first transform and the second transform is a low-complexity transform that has a size that is less than the predetermined threshold.

19 Claims, 8 Drawing Sheets

(51) Int. Cl.
*H04N 19/625* (2014.01)
*H04N 19/96* (2014.01)
*H04N 19/61* (2014.01)

(56) References Cited

U.S. PATENT DOCUMENTS

| | | | |
|---|---|---|---|
| 7,231,090 B2* | 6/2007 | Chen | H04N 19/63 |
| | | | 375/E7.03 |
| 8,155,195 B2* | 4/2012 | Regunathan | H04N 19/567 |
| | | | 375/240.16 |
| 9,191,260 B1* | 11/2015 | Grund | H04L 7/042 |
| 9,769,472 B2 | 9/2017 | Liu et al. | |
| 9,788,019 B2 | 10/2017 | Liu et al. | |
| 9,894,386 B2* | 2/2018 | Lee | H04N 19/44 |
| 10,536,720 B2* | 1/2020 | Zhao | H04N 19/176 |
| 2008/0165846 A1* | 7/2008 | Kim | H04N 19/16 |
| | | | 375/240.12 |
| 2011/0268225 A1* | 11/2011 | Cronie | H04L 25/0272 |
| | | | 375/296 |
| 2013/0003856 A1* | 1/2013 | Saxena | H04N 19/159 |
| | | | 375/240.18 |
| 2015/0326883 A1* | 11/2015 | Rosewarne | H04N 19/119 |
| | | | 375/240.18 |
| 2016/0050440 A1* | 2/2016 | Liu | H04N 19/597 |
| | | | 348/43 |
| 2016/0219290 A1* | 7/2016 | Zhao | H04N 19/109 |
| 2017/0150186 A1* | 5/2017 | Zhang | H04N 19/82 |
| 2018/0020218 A1* | 1/2018 | Zhao | H04N 19/124 |
| 2018/0176582 A1* | 6/2018 | Zhao | H04N 19/51 |
| 2018/0241996 A1* | 8/2018 | Kobayashi | H04N 19/14 |
| 2018/0278958 A1* | 9/2018 | Hsiang | H04N 19/157 |
| 2019/0075328 A1* | 3/2019 | Huang | H04N 19/96 |
| 2019/0306505 A1* | 10/2019 | Li | H04N 19/70 |

OTHER PUBLICATIONS

Shan Liu, et al. "Rectangular Partitioning for Intra Prediction in HEVC", Visual Communications and Image Processing (VCIP), IEEE, Jan. 2012, 6 pages.

* cited by examiner

FIG. 4    Encoder 203

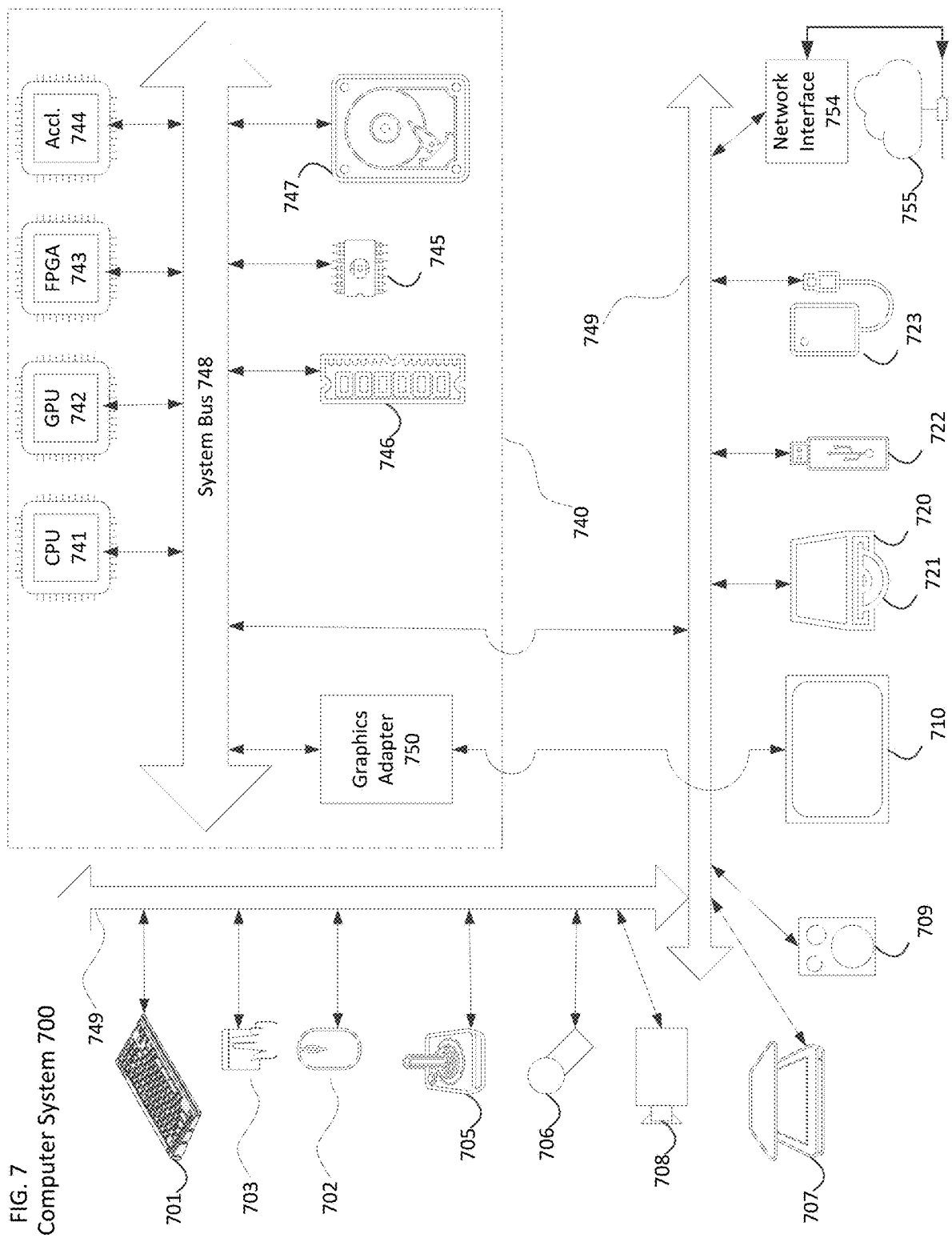

METHOD, APPARATUS AND MEDIUM FOR DECODING OR ENCODING USING A LOW-COMPLEXITY TRANSFORM

PRIORITY INFORMATION

This application claims priority from U.S. Provisional Application No. 62/626,539, filed on Feb. 5, 2018, in the United States Patent & Trademark Office, the disclosure of which are incorporated herein by reference in their entirety.

BACKGROUND

Field

This disclosure is directed towards video compression technologies. In particular, the present disclosure is directed towards next-generation video coding technologies including video coding/decoding technologies beyond High Efficiency Video Coding (HEVC). In particular, the present disclosure is directed at a potential need for standardization of future video coding technology with a compression capability that significantly exceeds that of the current HEVC standard (including its current extensions). As discussed in Non-Patent Literature #1, a Joint Exploration Model (JEM) has been developed to explore video coding technologies beyond the capability of HEVC. A recent version of JEM is JEM-7.0, which has an algorithm description of JVET-G1001. The disclosed subject matter may be used in the context of JEM 7.0 and modifications in JEM-7.0. More specifically, an aspect of the disclosure is directed towards a method, device and computer medium for encoding or decoding based on a low-complexity transform scheme for large size transform(s), e.g., 64-point, 128-point, 256-point and even above 256-point transforms.

Description of Related Art

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 hertz (Hz). Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A person of ordinary skill generally understands video compression/decompression technology. In general, to compress video or image data, a series of functional steps are performed to result in a compressed video or image file. Although an image, such as a 360° image (e.g., captured by a 360° camera) may be suitable for compression, for ease of reading, compression of a video file will be explained. To generate a compressed video file, under conventional standards (e.g., H.264, H.265) an uncompressed video sample stream that is received from a video source may be partitioned or parsed, which results in a block of samples of two or more reference pictures.

Bi-Prediction can relate to techniques where a prediction unit (PU), such as a predicted block of samples, can be predicted from two motion compensated blocks of samples of two or more reference pictures. Bi-prediction was first introduced into video coding standards in MPEG-1, and has also been included in other video coding technologies and standards such as MPEG-2 Part 2 (or H.262), H.264 and H.265 as well.

When decompressing a compressed video file, during the reconstruction of a sample of a bi-predicted PU, motion compensated and interpolated input samples from each reference block can be multiplied by a weighting factor that can be different for each reference block, and such weighted sample values of the two reference blocks can be added to generate the sample under reconstruction. Such sample can be processed further by mechanisms such as loop filtering.

In MPEG-1 and MPEG-2, the weighting factors can be determined based on the relative temporal distance between the picture to which the PU under reconstruction belongs to, and the two reference pictures. This is possible because, in MPEG-1 and MPEG-2, one of the two reference I or P pictures was in the "past", and the other in the "future" (in terms of presentation order) of the B-picture under reconstruction, and because in MPEG-1 and MPEG-2, there was a well-defined timing relationship established for any picture under reconstruction in relation to its reference pictures.

Starting with H.264, the reference picture selection concepts for bi-predicted pictures were relaxed such that the reference pictures only needed to be earlier in decoding order, but not in presentation order. Further, the notion of time was also relaxed in that neither H.264 nor H.265 require a constrained/fixed picture interval in the time domain. Therefore, a decoder cannot calculate weighting factors any more based on the timing information available in the bitstream. Instead, H.264 and H.265 include a "default" of 0.5 as the weighting factor for the reference samples of a bi-predicted picture. This default can be overwritten by a syntax available in the slice header known as pred_weight_table( ). The default of 0.5 or the information in the pred_weight_table may apply to all bi-predicted PUs in a given slice.

Problem(s) to be Solved

There has been experimental evidence that large transforms (beyond 32-point transforms) bring additional coding gain. However, introducing large transforms to video codec increases cost and complexity for computation, e.g., additional number of multiplication and additional multipliers. Moreover, introducing a large transform to a video codec increases an additional memory burden, including: 1) the pipeline buffer size is increased by 4× if the largest transform size is increased by 2× horizontally and vertically and 2) the large transform requires additional memory to store the transform kernels.

A method is proposed to approximate different types of DCTs and DSTs in JEM7 by applying adjustment stages to a transform in the DCT-2 family, which includes DCT-2, DCT-3, DST-2 and DST-3, and the adjustment stage refers to a matrix multiplication using a sparse matrix which requires relatively less operation counts. In Non-Patent Literature 1, a method for implementing N-point DST-7 using 2N+1 point Discrete Fourier Transform (DFT) is proposed.

However, additional transform types in AMT increase the complexity and implementation cost(s), since additional transform cores need to be stored in on-chip memory for practical implementation, and transform cores need to be loaded when switching the transform type from one block to another. In HEVC, a smaller DCT-2 transform is a part of the larger DCT-2 transform, which supports reusing the same logic for implementing different sizes of transforms. However, with AMT, such a feature is missing, other than DCT-2, a smaller transform cannot be re-used for a larger transform, which means different logic may need to be designed for implementing different sizes of transforms.

LISTING OF RELATED ART

Non-Patent Literature 1: J. Chen, E. Alshina, G. J. Sullivan, J.-R. Ohm, and J. Boyce, "Algorithm Description of Joint Exploration Test Model 7 (JEM 7)", Joint Video Exploration Team of ITU-T SG16 WP3 and ISO/IEC JTC1/SC29/WG11, JVET-G1001, 7th Meeting: Torino, IT, 13-21 Jul. 2017.

SUMMARY

According to an aspect of the disclosure, a method of encoding or decoding may include receiving information regarding a sound, video or image data block that is a target data block for encoding or decoding. The method of encoding or decoding may further include determining whether at least one of a width or a height of a data block size of the target data block is greater than or equal to a predetermined threshold. The method of encoding or decoding may further comprise, if the at least one of the width or the height of the data block size of the target data block is greater than or equal to the predetermined threshold, performing encoding or decoding of the target data block, but instead of applying a large transform having a size corresponding to the at least one of the width or the height of the data block size of the target data block, applying a first transform to a first portion of the target data block.

The method of encoding or decoding may further comprise applying the first transform or a second transform to a second portion of the target data block. The method of encoding or decoding may further comprise that at least one of the first transform and the second transform is a low-complexity transform that has a size that is less than the predetermined threshold.

According to an aspect of the disclosure, an apparatus may include at least one memory configured to store computer program code and at least one processor configured to access the at least one memory and operate according to the computer program code. The computer program code may include multiple pieces of applying code (e.g., first applying code, second applying code, third applying code and fourth applying code, etc.).

The first applying code may be configured to cause the at least one processor to receive information regarding a sound, video or image data block that is a target data block for encoding or decoding. The second applying code may be configured to cause the at least one processor to determine whether at least one of a width or a height of a data block size of the target data block is greater than or equal to a predetermined threshold.

The third applying code may be configured to cause the at least one processor to if the at least one of the width or the height of the data block size of the target data block is greater than or equal to the predetermined threshold, perform encoding or decoding of the target data block, but instead of applying a large transform having a size corresponding to the at least one of the width or the height of the data block size of the target data block, applying a first transform to a first portion of the target data block, and applying the first transform or a second transform to a second portion of the target data block. The apparatus may further include that at least one of the first transform and the second transform is a low-complexity transform that has a size that is less than the predetermined threshold.

According to an aspect of the disclosure, a non-transitory computer-readable storage medium may store instructions that cause one or more processors to execute a number of steps. The number of steps may include receiving information regarding a sound, video or image data block that is a target data block for encoding or decoding. The number of steps may further include determining whether at least one of a width or a height of a data block size of the target data block is greater than or equal to a predetermined threshold.

The number of steps may further include, if the at least one of the width or the height of the data block size of the target data block is greater than or equal to the predetermined threshold, performing encoding or decoding of the target data block, but instead of applying a large transform having a size corresponding to the at least one of the width or the height of the data block size of the target data block, applying a first transform to a first portion of the target data block, and applying the first transform or a second transform to a second portion of the target data block. The number of steps may further include that at least one of the first transform and the second transform is a low-complexity transform that has a size that is less than the predetermined threshold.

BRIEF DESCRIPTION OF THE DRAWINGS

Further features, the nature, and various advantages of the disclosed subject matter will be more apparent from the following detailed description and the accompanying drawings in which:

FIG. 7 is a schematic illustration of a computer system in accordance with an embodiment.

DETAILED DESCRIPTION

Figure 1:
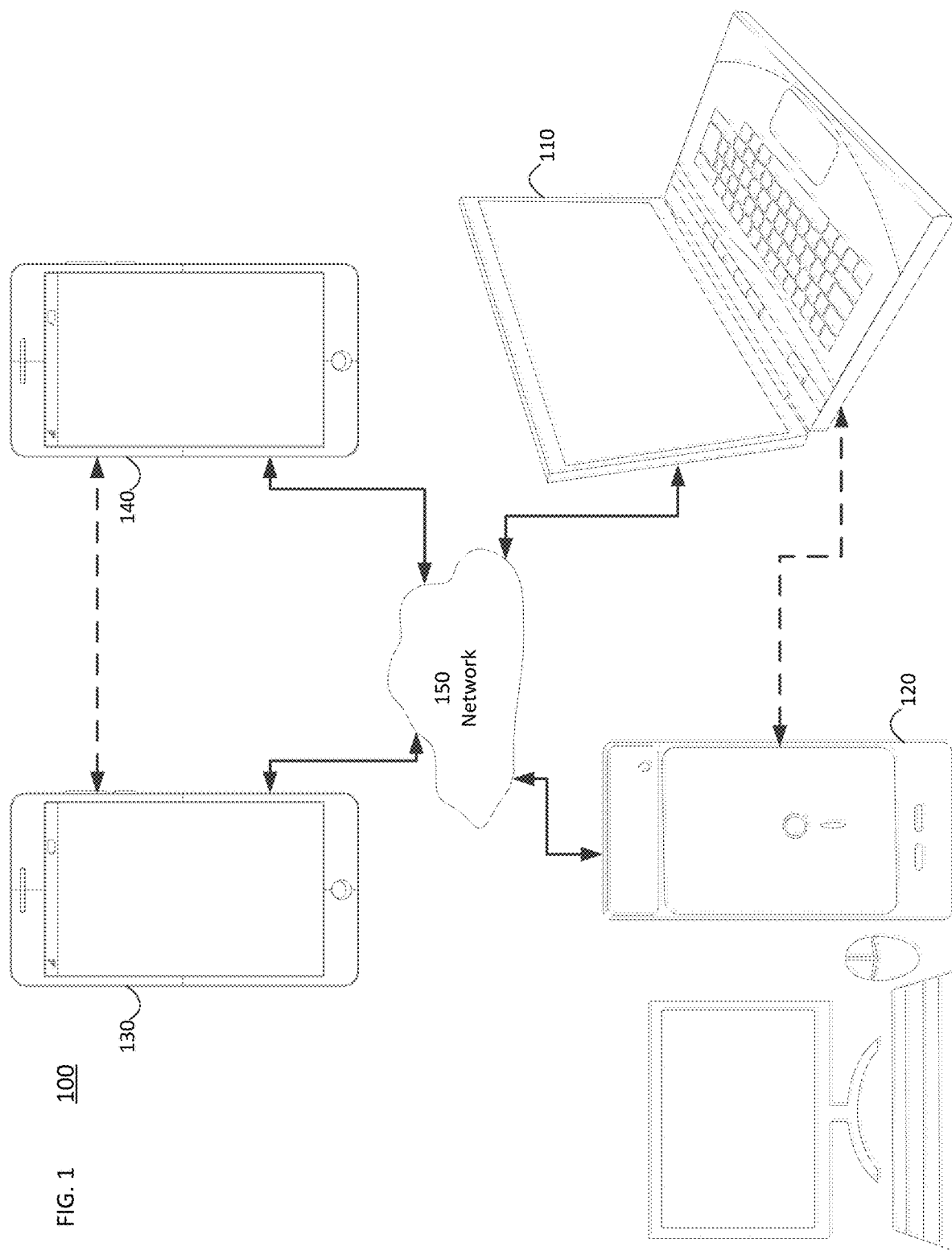
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as a laptop 110, a server 120, and smartphones 130 and 140, but the principles of the present disclosure are not so limited. Embodiments of the present disclosure find application with other equipment including but not limited to laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
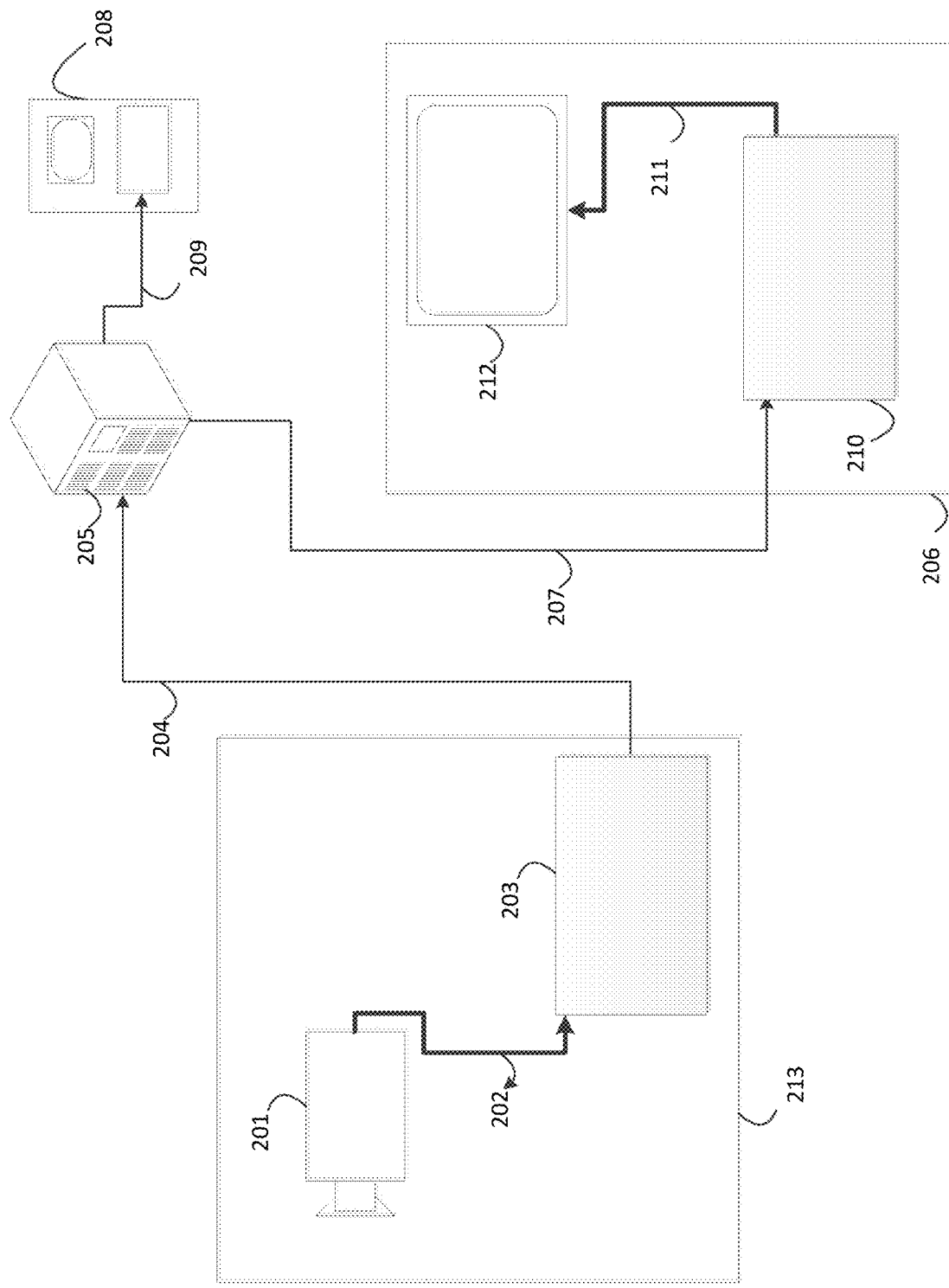
FIG. 2 is a schematic illustration of a simplified block diagram of a streaming system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system 200 may include a capture subsystem (213), which can include a video source (201), for example a digital camera, which may create an uncompressed video sample stream (202). That sample stream (202), depicted as a bold line to emphasize a high data volume when compared to encoded video bit streams, can be processed by an encoder (203) coupled to the camera (201). The encoder (203) can include hardware (e.g., a processor or circuit and memory), software, or a combination thereof to enable or implement aspects of the disclosed subject matter as described in more detail below. The encoded video bit stream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted).

Figure 3:
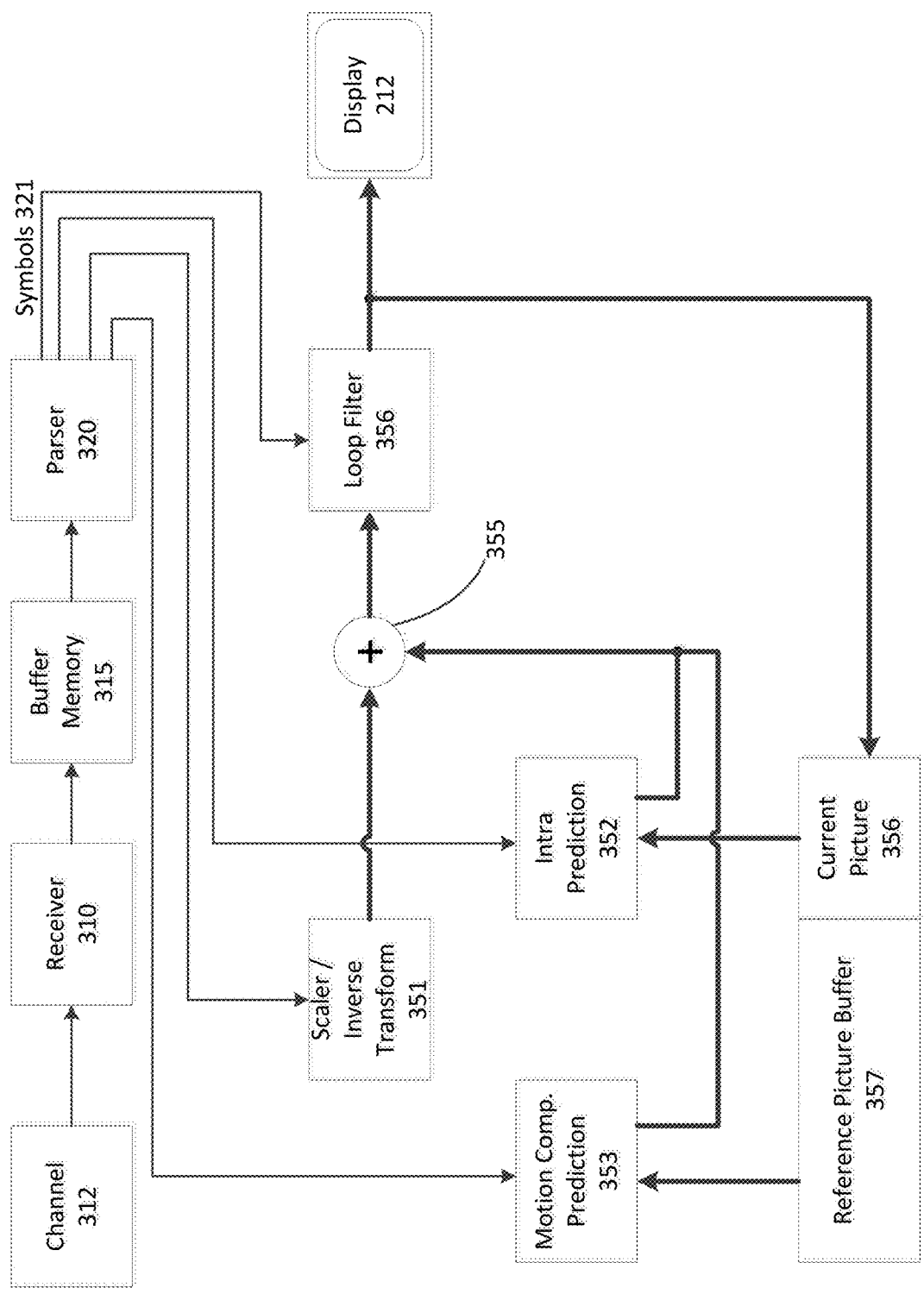
FIG. 3 is a schematic illustration of a simplified block diagram of a decoder in accordance with an embodiment.

FIG. 3 illustrates a functional block diagram of a video decoder (210) according to an embodiment of the present disclosure. As shown in FIG. 3, a receiver (310) may receive one or more codec video sequences to be decoded by the decoder (210). In the same or another embodiment, one coded video sequence may be received at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosynchronous network, the buffer (315) may not be needed, or can be small. For use on best effort packet networks such as the Internet, the buffer (315) may be required, which can be comparatively large and can advantageously be of adaptive size.

The video decoder (310) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIGS. 2 and 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so as to create symbols (321). Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit may be the scaler/inverse transform unit (351). The scaler/inverse transform unit (351) may receive a quantized transform coefficient as well as control information, including which transform to use, a data block size, a quantization factor, quantization scaling matrices, etc. as symbol(s) (321) from the parser (320). It can output blocks comprising sample values that can be input into an aggregator (355).

In some cases, the output samples of the scaler/inverse transform (351) can pertain to an intra-coded block, which is a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (356). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter-coded block, and a potentially motion compensated block. In such a case, a Motion Compensation Prediction unit (353) can access reference a picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory (356) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (356) can become part of the reference picture buffer (357), and a fresh current picture memory can be reallocated before commencing the reconstruction of the following coded picture.

The video decoder 320 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), and/or maximum reference picture size. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (320) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
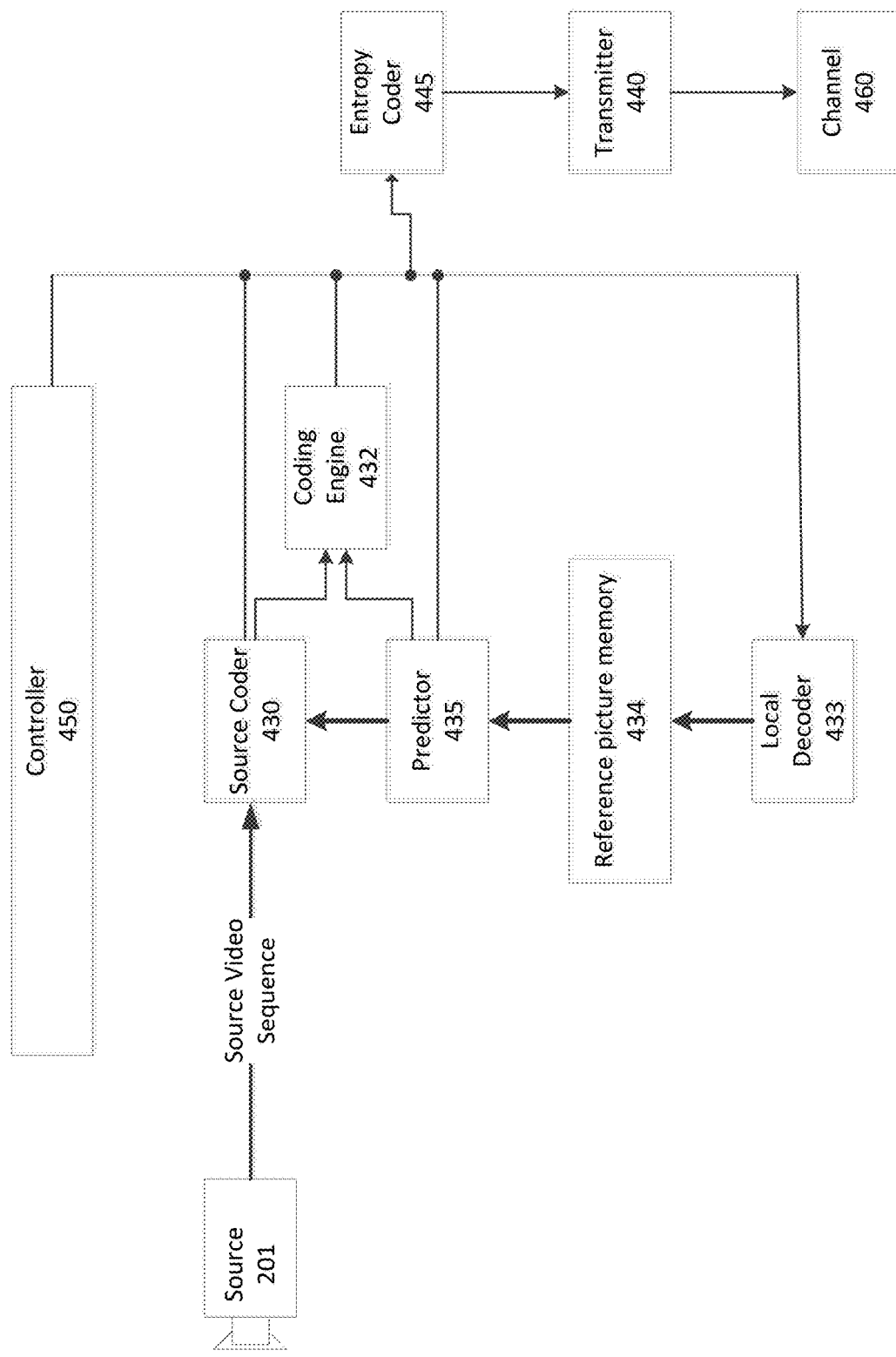
FIG. 4 is a schematic illustration of a simplified block diagram of an encoder in accordance with an embodiment.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device, which may include a memory and processor, that stores previously prepared video. In a videoconferencing system, the video source (201) may include a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence in real time or under any other time constraints as required by the application. Enforcing appropriate coding speed is one function of controller (450). Controller controls other functional units as described below and is functionally coupled to these units. The coupling is not depicted for clarity. Parameters set by the controller can include rate control related parameters (e.g., picture skip, quantizer, lambda value of rate-distortion optimization techniques), a picture size, a group of pictures (GOP) layout, a maximum motion vector search range, and so forth. A person skilled in the art can readily identify other functions of controller (450) as they may pertain to video encoder (203) optimized for a certain system design.

Some video encoders operate in what a person skilled in the art readily recognizes as a "coding loop." As an oversimplified description, a coding loop can consist of the encoding part of an encoder (430) ("source coder" henceforth), which is responsible for creating symbols based on an input picture to be coded, and a reference picture(s), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of a decoder location (local or remote), the reference picture buffer content is also bit exact between local encoder and remote encoder. In other words, the prediction part of an encoder "sees," as reference picture samples, exactly the same sample values as a decoder would "see" when using prediction during decoding. This fundamental principle of reference picture synchronicity (and resulting drift, if synchronicity cannot be maintained, for example, because of channel errors) is well known to a person skilled in the art.

The operation of the "local" decoder (433) can be the same as of a "remote" decoder (210), which has already been described in detail above in conjunction with FIG. 3. Briefly referring also to FIG. 3, however, as symbols are available and en/decoding of symbols to a coded video sequence by entropy coder (445) and parser (320) can be lossless, the entropy decoding parts of decoder (210) (including channel (312), receiver (310), buffer (315), and parser (320)) may not be fully implemented in local decoder (433).

An observation that can be made at this point is that any decoder technology except the parsing/entropy decoding that is present in a decoder also necessarily needs to be present, in substantially identical functional form, in a corresponding encoder. The description of encoder technologies are the inverse of the described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder may translate the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types from among, for example, an Intra Picture (I picture), a Predictive picture (P picture) and a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive Picture (P picture) may be one that may be coded and decoded using intra prediction or inter prediction using at most one motion vector and reference index to predict the sample values of each data block.

A Bi-directionally Predictive Picture (B Picture) may be one that may be coded and decoded using intra prediction or inter prediction using at most two motion vectors and reference indices to predict the sample values of each data block. Similarly, multiple-predictive pictures can use more than two reference pictures and associated metadata for the reconstruction of a single block.

Source pictures commonly may be subdivided spatially into a plurality of sample data blocks (for example, blocks of 4×4, 8×8, 4×8, or 16×16 samples each) and coded on a block-by-block basis. Data blocks may be coded predictively with reference to other (already coded) data blocks as determined by the coding assignment applied to the data blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

As discussed above, the coding of the coded video sequence can be in accordance with a video coding technology or standard, and can follow principles well known to a person skilled in the art, including variable length coding, Huffman coding, arithmetic coding with or without context sensitivity, and so forth. In some streaming systems, the video bitstreams (204, 207, 209) can be encoded according to certain video coding/compression standards. An example of those standards include ITU-T HEVC Recommendation of H.265.

As discussed above JEM 7.0 provides higher compression capabilities. The following Sections 1.1 and 1.2 describe the modifications in the JEM-7.0 which are related to this disclosure.

Section 1.1: QTBT Block Partitioning Structure

In HEVC, a CTU is split into CUs by using a quadtree structure denoted as a coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process may be applied and the relevant information may be transmitted to the decoder on a PU basis. After obtaining the residual data block by applying the prediction process based on the PU splitting type, a CU can be partitioned into transform units (TUs) according to another quadtree structure similar to the coding tree for the CU. One of the key features of the HEVC structure is that it has multiple partition conceptions including CU, PU, and TU.

Figure 6A:
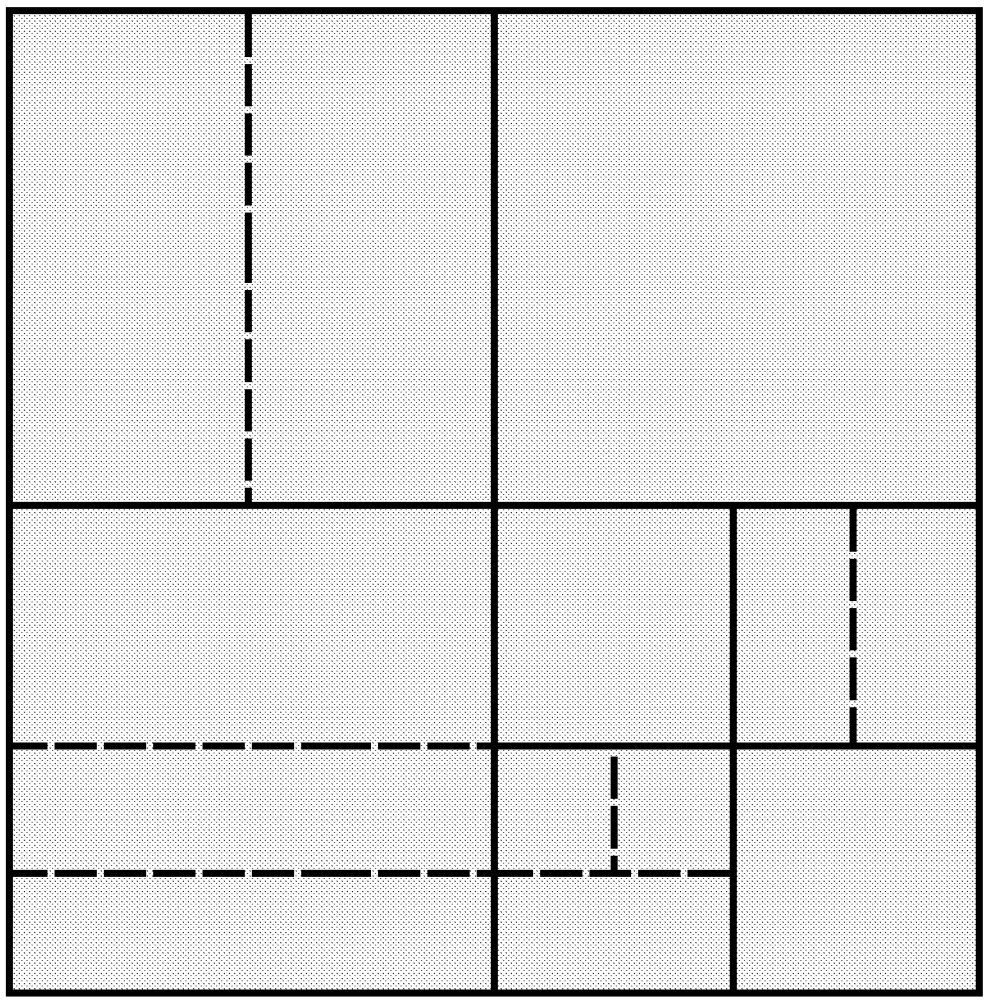
FIG. 6A illustrates an example of block partitioning by using a quadtree plus binary tree (QTBT).

The QTBT structure removes the concepts of multiple partition types, i.e., it removes the separation of the CU, PU and TU concepts, and supports more flexibility for CU partition shapes. In the QTBT block structure, a CU can have either a square or rectangular shape. As shown in FIG. 6A, a coding tree unit (CTU) may first be partitioned by a quadtree structure. The quadtree leaf nodes may be further partitioned by a binary tree structure. There are two splitting types (symmetric horizontal splitting and symmetric vertical splitting) in the binary tree splitting. The binary tree leaf nodes are called coding units (CUs), and that segmentation is used for prediction and transform processing without any further partitioning. In other words, the CU, PU and TU have the same block size in the QTBT coding block structure. In the JEM, a CU sometimes consists of coding blocks (CBs) of different colour components, e.g., one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters may be defined for the QTBT partitioning scheme.

CTU size: the root node size of a quadtree, the same concept as in HEVC

MinQTSize: the minimum allowed quadtree leaf node size

MaxBTSize: the maximum allowed binary tree root node size

MaxBTDepth: the maximum allowed binary tree depth

MinBTSize: the minimum allowed binary tree leaf node size

In one example of the QTBT partitioning structure, the CTU size may be set as 128×128 luma samples with two corresponding 64×64 blocks of chroma samples, the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered.

The leaf nodes of the binary tree are further processed by prediction and transform processing without any further partitioning. In the JEM, the maximum CTU size is 256×256 luma samples.

Figure 6B:
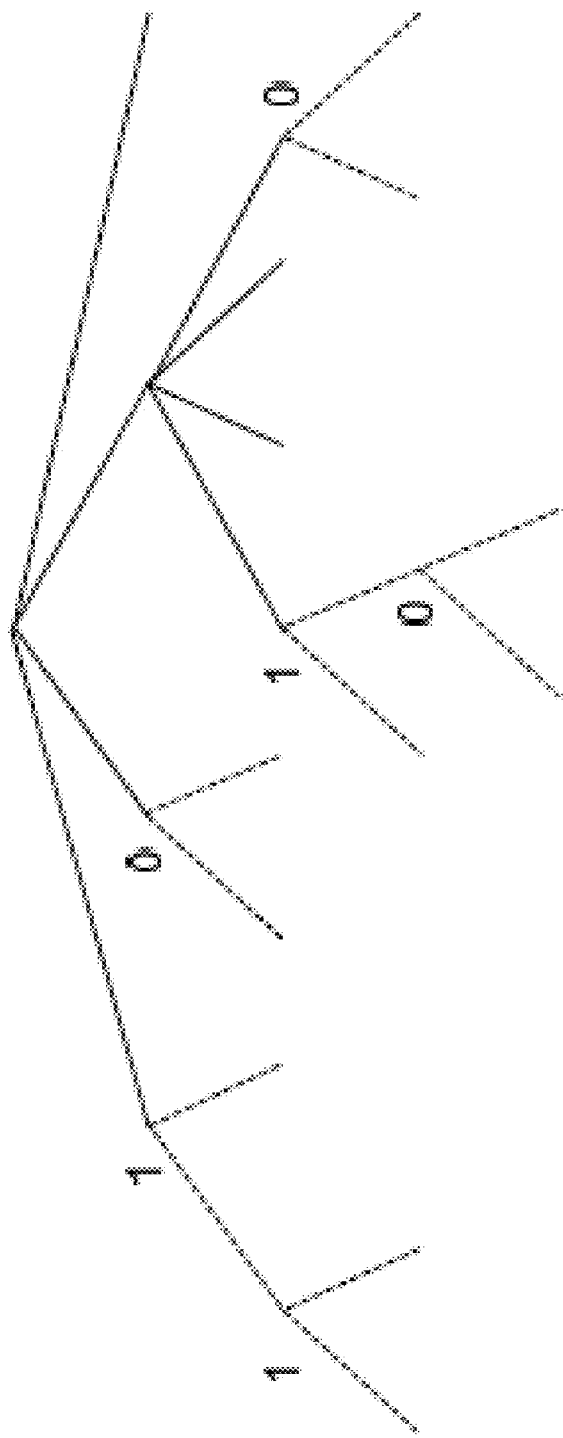
FIG. 6B illustrates a corresponding tree representation of the block partitioning of FIG. 6A.

FIG. 6A illustrates an example of block partitioning by using a quadtree plus binary tree (QTBT) and FIG. 6B illustrates a corresponding tree representation of the block partitioning of FIG. 6A. In FIG. 6A, the solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a data block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB may be partitioned into CUs by a QTBT structure, and the chroma CTBs are partitioned into chroma CUs by another QTBT structure. This means that a CU in an I slice consists of a coding data block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

Section 1.2: Large Block-Size Transforms with High-Frequency Zeroing

In the JEM, large block-size transforms, up to 128×128 in size, are enabled, which may be primarily useful for higher resolution video, e.g., 1080p and 4 K sequences. High frequency transform coefficients are zeroed out for the transform blocks with size (width or height, or both width and height) larger than or equal to 64, so that only the lower-frequency coefficients are maintained. For example, for an M×N transform block, with M as the block width and N as the block height, when M is larger than or equal to 64, only the left 32 columns of transform coefficients are kept. Similarly, when N is larger than or equal to 64, only the top 32 rows of transform coefficients are kept. When transform skip mode is used for a large block, the entire block is used without zeroing out any values.

Section 1.3: Adaptive Multiple Core Transform

In addition to DCT-2 and 4×4 DST-7, which have been employed in HEVC, an Adaptive Multiple Transform (AMT, or as known as Enhanced Multiple Transform (EMT)) scheme has been proposed for residual coding for both inter and intra coded data blocks. The AMT may use multiple selected transforms from the DCT/DST families other than the current transforms in HEVC. The newly introduced transform matrices may include DST-7, DCT-8, DST-1 and DCT-5. Table 1 below shows exemplary basis functions of a selected DST/DCT.

TABLE 1

Transform basis functions of DCT-II/VIII and DST-I/VII for N-point input

| Transform Type | Basis function $T_i(j)$, $i, j = 0, 1, \ldots, N - 1$ |
|---|---|
| DCT-2 | $T_i(j) = \omega_0 \cdot \sqrt{\frac{2}{N}} \cdot \cos\left(\frac{\pi \cdot i \cdot (2j+1)}{2N}\right)$ |
| | where $\omega_0 = \begin{cases} \sqrt{\frac{2}{N}} & i = 0 \\ 1 & i \neq 0 \end{cases}$ |
| DCT-5 | $T_i(j) = \omega_0 \cdot \omega_1 \cdot \sqrt{\frac{2}{2N-1}} \cdot \cos\left(\frac{2\pi \cdot i \cdot j}{2N-1}\right)$, |

TABLE 1-continued

Transform basis functions of DCT-II/VIII and DST-I/VII for N-point input

| Transform Type | Basis function $T_i(j)$, $i, j = 0, 1, \ldots, N - 1$ |
|---|---|
| | where $\omega_0 = \begin{cases} \sqrt{\frac{2}{N}} & i = 0 \\ 1 & i \neq 0 \end{cases}$, $\omega_1 = \begin{cases} \sqrt{\frac{2}{N}} & j = 0 \\ 1 & j \neq 0 \end{cases}$ |
| DCT-8 | $T_i(j) = \sqrt{\frac{4}{2N+1}} \cdot \cos\left(\frac{\pi \cdot (2i+1) \cdot (2j+1)}{4N+2}\right)$ |
| DST-1 | $T_i(j) = \sqrt{\frac{2}{N+1}} \cdot \sin\left(\frac{\pi \cdot (i+1) \cdot (j+1)}{N+1}\right)$ |
| DST-7 | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices may be quantized more accurately than the transform matrices in HEVC. To keep the intermediate values of the transformed coefficients within the range of 16-bit, after horizontal and after vertical transform, all the coefficients may be right shifted by 2 more bits compared to the right shift used in the current HEVC transforms. The AMT may apply to coding units (CUs) with both width and height smaller than or equal to 64, and whether AMT applies or not may be controlled by a CU level flag. When the CU level flag is equal to 0, DCT-2 may be applied in the CU to encode the residue. For luma coding block within an AMT-enabled CU, two additional flags may be signalled to identify the horizontal and vertical transform to be used. As in HEVC, the residual of a block can be coded with transform skip mode in the JEM. To avoid the redundancy of syntax coding, the transform skip flag is not signalled when the CU level AMT flag is not equal to zero.

For intra residue coding, due to the different residual statistics of different intra prediction modes, a mode-dependent transform candidate selection process may be used. Three transform subsets may be defined as shown in Table 2 below, and the transform subset may be selected based on the intra prediction mode, as specified in Table 3 below.

TABLE 2

Three pre-defined transform candidate sets

| Transform Set | Transform Candidates |
|---|---|
| 0 | DST-7 DCT-8 |
| 1 | DST-7, DST-1 |
| 2 | DST-7, DCT-5 |

With the subset concept, a transform subset may be first identified based on Table 3 using the intra prediction mode of a CU with a CU-level AMT flag that is equal to 1. After that, for each of the horizontal transform and the vertical transform, one of the two transform candidates in the identified transform subset, according to Table 2, may be selected based on being explicitly signalled with flags.

TABLE 3

Selected (H)orizontal and (V)ertical transform sets for each intra prediction mode

| Intra Mode | | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | | | | | | | | | | | | | | | | | |
|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 |
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | | | | | | | | | | | | | | | | | |
|---|---|---|---|---|---|---|---|---|---|---|---|---|---|---|---|---|---|
| | 35 | 36 | 37 | 38 | 39 | 40 | 41 | 42 | 43 | 44 | 45 | 46 | 47 | 48 | 49 | 50 | 51 | 52 |
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | | | | | | | | | | | | | |
|---|---|---|---|---|---|---|---|---|---|---|---|---|---|
| | 53 | 54 | 55 | 56 | 57 | 58 | 59 | 60 | 61 | 62 | 63 | 64 | 65 | 66 |
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

However, for inter prediction residual, only one transform set, which consists of DST-7 and DCT-8, may be used for all inter modes and for both horizontal and vertical transforms. The complexity of AMT would be relatively high at the encoder side, since a total of five different transform candidates (DCT-II and four multiple transform candidates) need to be evaluated with rate-distortion cost for each residual block when brute-force search is used. To alleviate this complexity issue at the encoder, several optimization methods are designed for algorithm acceleration in the JEM.

There has been experimental evidence that large transform (beyond 32-point transforms) bring additional coding gain. However, introducing large transform to video codec increases cost and complexity for computation, e.g., additional number of multiplication and additional multipliers. Moreover, introducing large transform to video codec increases additional memory burden, including: 1) the pipeline buffer size is increased by 4× if the largest transform size is increased by 2× horizontally and vertically and 2) the large transform requires additional memory to store the transform kernels.

The methods discussed below may be used separately or combined in any order.

For large transforms, instead of applying the traditional DCT-II, a low-complexity multiplication free transform may be applied. Moreover, in this example, the transform kernel is very simple so that the memory needed by storing a transform kernel is not big or the kernel can be easily derived with a simple pattern.

The large transform may include, but is not limited to, 128-point, 256-point and 512-point transforms, and/or any transform size beyond 64-point transform, or beyond 32-point transform. The low-complexity multiplication free transform may include, but is not limited to Hadamard transform of which the transform core only consists of 1 and −1, and a transform of which the transform core only consists of power of 2. The Hadamard-Walsh transform is also commonly referred to as a Hadamard transform, or a Walsh Transform, and those terms are used interchangeably in the disclosure to mean the same transform.

The low-complexity multiplication free transform core may be scaled accordingly to re-use the same quantization scheme of other transform sizes. In one example, in HEVC, the N-point transform core may be scaled by 64*sqrt(N) using the orthogonal transform core K which satisfies K*K' is an identify matrix. In this case, when applying the large transform, the N-point transform core is scaled by 64*sqrt(N) accordingly.

Alternatively, the large transform may be scaled differently and the internal rounding operations (right shift) after horizontal and vertical transform may be adjusted accordingly to match the different scaling. For example, when a Hadamard-Walsh transform is used, the right shift bits after horizontal and vertical transform is reduced according to the different scaling factor.

In one example, in an HEVC reference example, the right shift after forward horizontal transform is (log 2(Width)+bitDepth+6)−15, and the right shift after forward vertical transform is (log 2(Height)+6). With the proposed method, if the large transform is a Hadamard-Walsh transform of which the transform core is composed of 1 and −1, the right shift after forward horizontal transform is (log 2(Width)+bitDepth+6)−21, and the right shift after forward vertical transform is log 2(Height). Accordingly, in HEVC, the right shift after inverse vertical transform is 7, and the right shift after inverse horizontal transform is 20− bitDepth.

With the proposed method, if the large transform is a Hadamard-Walsh transform of which the transform core is composed of 1 and −1, the right shift after inverse vertical transform is 1, and the right shift after inverse horizontal transform is 14− bitDepth.

Alternatively, the large transform may be scaled differently from other transform sizes and a different quantization scheme is applied.

The low-complexity multiplication transform may be used in conjunction with the other transforms, including but not limited to DCT. In one example, instead of applying a large 128-point/256-point transform on a 128×M, M×128, 256×M or M×256 block, a X×Y transform, where X and Y can be 2, 4, 8, 16, 32 or 64, is first applied on every non-overlapped N×N blocks, and after that another transform may be applied on top of the transform coefficients generated by the X×Y transforms. Either the first X×Y and/or the second transform may be a low-complexity multiplication free transform or other transforms (including but not limited to DCT/DST, KLT etc.).

In another example, instead of applying a large transform on a 128×M, M×128, 256×M or M×256 block, the block may be subsampled by a factor s. The large transform may be a transform that is a 128-point transform or a 256-point transform. For example when s equals to 2, it means the block is subsampled by 2, and the even samples compose one block and the odd samples compose another block. The subsampling may be applied on either/both horizontal/vertical directions.

On the encoder side, a first transform may be applied on each sub-sampled block, and the transform coefficients are generated for each sub-sampled block, after that, the transform coefficients may be weighted and summed to generate another transform coefficient block which will be further quantized and entropy coded.

On the decoder side, the dequantized transform block may be reverse transformed and residual blocks are up sampled to the original block size.

In addition, different zero-out methods may be performed on different block sizes. In particular, a different number of zeroed transform coefficients may be applied for different block sizes, and for a larger transform, a smaller number of transform coefficients are allowed to be non-zero. In one sample, for a 128-point transform, only the first 64, 32, 16, 8, 4, 2 or 1 transform coefficients may be used and the remaining coefficients may be zeroed. In another sample, for a 256-point transform, only the first 128, 64, 32, 16, 8, 4, 2 or 1 are used and the remaining coefficients may be zeroed. One typical selection is, for 128-point transform, only the first 16 coefficients are kept, and for 256-point transform, only the first 4 coefficients are kept so that less number of non-zero coefficients are allowed in the larger transform.

The number of zeroed transform coefficients may depend on several coded information, including but not limited to: intra/inter coded, picture resolution, temporal layer, quantization parameter (QP), transform type, and luma/chroma component.

For the case of applying a non-square transform M×N, assuming only first m coefficients are kept for M-point transform and first n coefficients are kept for N-point transform, then the top-left m×n coefficients are kept for non-square transform M×N. In one example, for 64-point, 128-point and 256-point transform, the first 32, 16 and 4 transform coefficients may be kept, respectively. Then for a 128×32 transform, the top-left 16×32 transform coefficients may be kept and the remaining coefficients may be zero. For a 64×128 transform, the top-left 32×16 transform coefficients may be kept and the remaining coefficients may be zero. For a 16×256 transform, the top-left 16×4 transform coefficients may be kept and the remaining coefficients may be zero.

If only 1 transform coefficient is kept for the horizontal/vertical direction and remaining coefficients are all zeroed out, it means if Coded Block Flag (CBF) is nonzero, the last position in the horizontal/vertical direction must be 1 and thus no need to be coded.

Alternatively, if all transform coefficients for the horizontal/vertical direction are zero, it means Coded Block Flag (CBF) is always 0, CBF does not need to be signaled and there is no need to do transform coefficient parsing, dequantization or inverse transform.

In one example, for a 32×256 block, since zero-out is not applied for 32-point transform, but all transform coefficients are zero for 256-point transform, in this case the CBF is always 0 for 32×256 block.

Alternatively, the number of non-zero transform coefficients depends on the block area size, and for each block size, which part of the top-left transform coefficients may be kept as non-zero, i.e., m×n, are pre-defined. In one example embodiment, m and n may be a fraction of M and N, respectively. For example, m=M>>k and n=N>>j, where k and j may be equal to 1, 2, 3, or any non-negative integer. For another example, m=M/k and n=N/j, where k and j may be equal to 1, 2, 3, or any positive integer, m and n are rounded (up or down) to the nearest integer. Parameters k and j may be equal to each other or different, may be pre-defined, or signaled in a slice header, PPS (picture parameter set), SPS (sequence parameter set) or other coding region headers.

Alternatively, when large transform needs to be applied in the horizontal and/or vertical direction, instead of applying a large M×N transform, multiples of smaller block size transform may be applied along the horizontal and/or vertical directions, and zero-out may be applied for each smaller block size transform, and the results are weighted and summed up to generate the transform coefficients for the whole block. When inverse large transform needs to be applied in the horizontal and/or vertical direction, instead of applying a large M×N inverse transform, a smaller block size transform may be applied and then up sampled to M×N to generate the residuals for the whole block.

In one example, a 64×64 dequantized transform coefficient block of which only the top-left 32×32 coefficients can be non-zero, an inverse 64×64 transform may be applied and a 64×64 residual block may be generated. After that, the 64×64 residual block may be up sampled to generate a 128×256 residual block. The up sampling process may be performed by duplicating or interleaving the 64×64 residual block to a 128×256 residual block, or it may be performed by using a given up-sampling filter. An up-sampling filter includes, but is not limited to, a N-tap Cubic interpolation filter, a N-tap DCT interpolation filter, or the interpolation filter used to generate sub-pel pixel for motion compensation.

Figure 5:
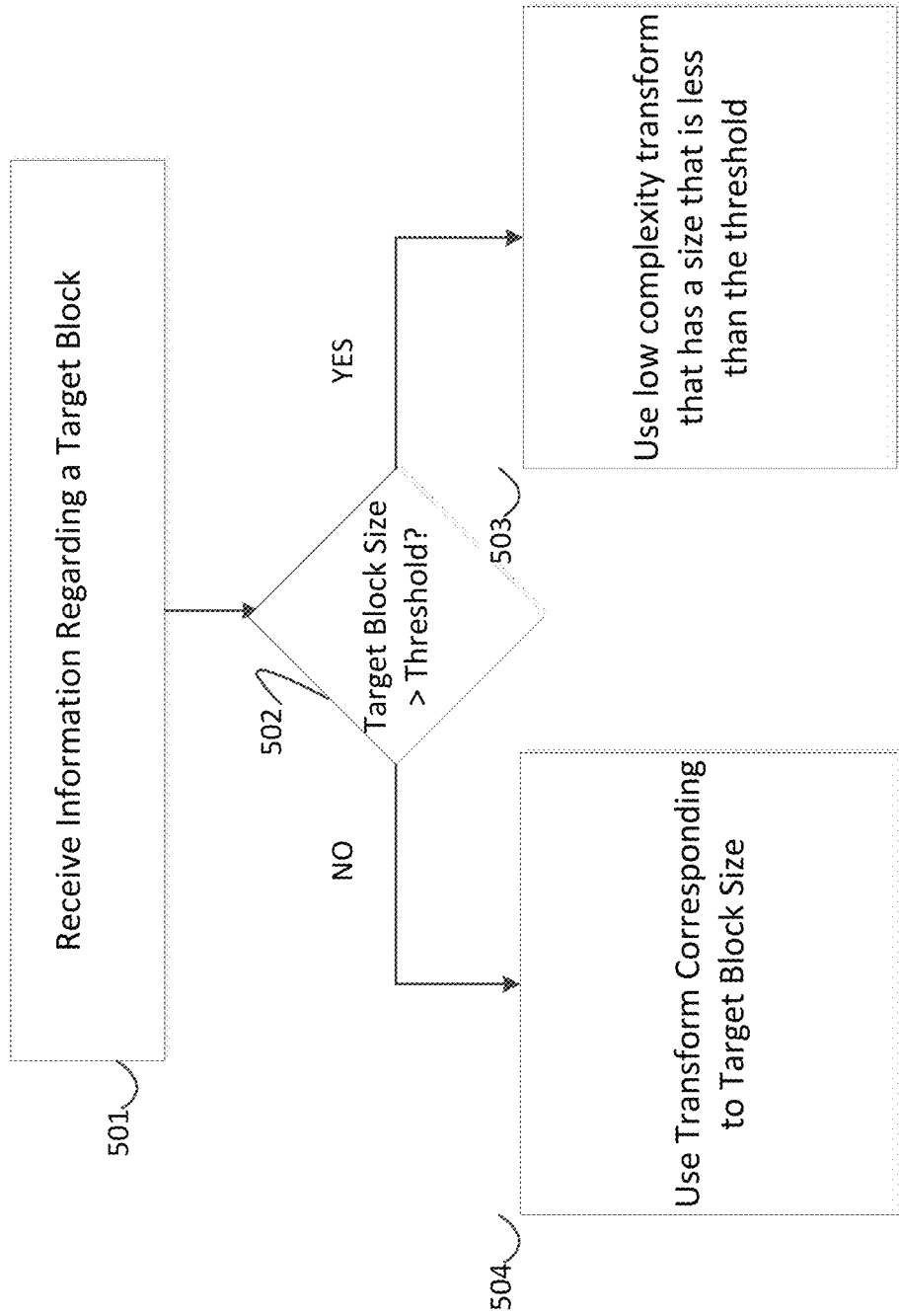
FIG. 5 is a schematic illustration of an exemplary method of encoding or decoding in accordance with an embodiment.

Referring to FIG. 5, in a first, simple example, a method of utilizing a method of encoding or decoding utilizing a low complexity transform may include the following steps illustrated in FIG. 5. Step 501: receiving information regarding a sound, video or image block that is a target block for encoding or decoding. The method of FIG. 5 may also include a Step 502 that includes determining whether at least one of a width or a height of a block size of the target block is greater than or equal to a predetermined threshold.

As shown in FIG. 5, if the Step 502 determination is YES (i.e., Target Block Size>Threshold), Step 503 is performed. Step 503 includes, if the at least one of the width or the height of the block size of the target block is greater than or equal to the predetermined threshold, performing encoding or decoding of the target block, but instead of applying a large transform having a size corresponding to the at least one of the width or the height of the block size of the target block, applying a first transform to a first portion of the target block, and applying the first transform or a second transform to a second portion of the target block. When the determination in Step 502 is NO, Step 504 is performed.

Step 504 may include using a transform having a size corresponding to the target block size. The method of FIG. 5 may also includes that at least one of the first transform and the second transform is a low-complexity transform that has a size that is less than the predetermined threshold. The method illustrated in FIG. 5 may also include processing Steps 501-504 being performed by one or more processors. The method illustrated in FIG. 5 may also include storing, by the one or more processors in a memory, the low complexity data structure(s) in advance before or during the performing of the Steps 501-504.

The method illustrated in FIG. 5 may also include that the low-complexity transform is one of: a Hadamard transform of which the transform core only consists of 1 and −1, and a predetermined transform of which the transform core only consists of power of 2.

The method illustrated in FIG. 5 may further comprise zeroing out high frequency transform coefficients so that only lower-frequency transform coefficients are maintained.

The method illustrated in FIG. 5 may also include that the scaling of the low-complexity transform re-uses a same quantization scheme of another transform size that is different than the size of the low-complexity transform such that an N-point transform core is scaled by 64*sqrt(N) using an orthogonal transform core K which satisfies K*K' K*K', which is an identify matrix such that when applying the low-complexity transform, the N-point transform core is scaled by 64*sqrt(N), wherein K' is the inverse of K.

The method illustrated in FIG. 5 may also include that the low complexity transform is one of: a Hadamard-Walsh transform of which the transform core only consists of 1 and −1, and a transform of which the transform core only consists of a power of 2, and may further comprise: generating a quantization scheme by scaling the low complexity transform, if the low complexity transform is not the Hadamard-Walsh transform: causing or transmitting information that causes the target block to be encoded or decoded using the generated quantization scheme, and if the low complexity transform is the Hadamard-Walsh transform: (i) adjusting the quantization scheme by performing shifting to compensate for a difference in scaling in large transforms; and (ii) causing or transmitting information that causes the target block to be encoded or decoded using the adjusted quantization scheme, wherein the decoding comprises: reverse transforming the target block to derive a dequantized transform block and up sampling the residual block(s) to an original block size.

The method illustrated in FIG. 5 may also include that the low complexity transform is a Hadamard-Walsh transform, and because the scaling of large transforms are scaled differently, internal rounding operations, which includes at least a right shift operation, after horizontal and vertical transform are adjusted accordingly to match the different scaling. The method illustrated in FIG. 5 may also include: first applying a X×Y transform, where X and Y can be 2, 4, 8, 16, 32 or 64, on every non-overlapped N×N blocks, and subsequently applying a second transform on top of the transform coefficients generated by the X×Y transform, wherein either the first X×Y and/or the second transform are the low complexity transform.

The method illustrated in FIG. 5 may also include that, for a target block with the at least one of the width and the height of the block size that that are equal to 128, for the 128-point transform, only the first 64, 32, 16, 8, 4, 2 or 1 transform coefficients are used and remaining coefficients are zeroed out.

The method illustrated in FIG. 5 may also include that instead of applying a large 128-point/256-point transform on a 128×M, M×128, 256×M or M×256 block, the block is subsampled by a factor s, and the even samples compose one block and the odd samples compose another block, the subsampling is applied on either/both horizontal/vertical directions, the encoding comprises: applying the first transform on each sub-sampled block, and generating the transform coefficients for each sub-sampled block, and, subsequently, the transform coefficients are weighted and summed to generate another transform coefficient block which is further quantized and entropy coded, and the decoding comprises: the dequantized transform block is reverse transformed and residual blocks are up sampled to the original block size.

The method illustrated in FIG. 5 may also include that when a large transform needs to be applied in the horizontal and/or vertical direction, instead of applying a large M×N transform, multiples of a smaller block size transform are applied along the horizontal and/or vertical directions, and zero-out is applied for each smaller block size transform, and the results are weighted and summed up to generate the transform coefficients for the whole block and when an inverse large transform needs to be applied in the horizontal and/or vertical direction, instead of applying a large M×N inverse transform, a smaller block size transform is applied and then up sampled to M×N to generate the residuals for the whole block.

The techniques for encoding/decoding can be implemented by one or more processors that may execute computer software having computer-readable instructions that may be physically stored in one or more computer-readable media (e.g., a hard disk drive). For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove (not depicted), joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove (not depicted), or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" or "computer readable medium" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method comprising:
receiving information regarding a target data block for decoding, wherein the target data block includes at least one of sound or imagery;
identifying whether at least one of a width or a height of a block size of the target data block is greater than or equal to a predetermined threshold, the predetermined threshold being 64 or greater; and
based on the at least one of the width or the height of the block size of the target data block being greater than or equal to the predetermined threshold, decoding the target data block, by applying a first transform to a first portion of the target data block, and applying a second transform to a second portion of the target data block, wherein
the second transform is a low-complexity transform that has a size that is less than the predetermined threshold,
the second transform is one of: a Hadamard-Walsh transform of which the transform core only consists of 1 and −1, or a predetermined transform of which the transform core only consists of power of 2,
the low-complexity transform is scaled accordingly to re-use a same quantization scheme of another transform size that is different than the size of the low-complexity transform, and
instead of applying a large transform, which is a transform that is 64-point or greater, the target data block is subsampled by a factor s, and the even samples compose one new block and the odd samples compose another new block.

2. The method according to claim 1, wherein the processing steps of claim 1 are performed by one or more processors.

3. The method according to claim 1, further comprising zeroing out high frequency transform coefficients so that only lower-frequency transform coefficients are maintained.

4. The method according to claim 1, wherein the scaling of the low-complexity transform re-using the same quantization scheme of the other transform size that is different from the size of the low-complexity transform is such that an N-point transform core is scaled by 64*sqrt(N) using an orthogonal transform core K which satisfies K*K' is an identity matrix such that when applying the low-complexity transform, the N-point transform core is scaled by 64*sqrt(N).

5. The method according to claim 1, wherein the method further comprises:
after generating the quantization scheme by scaling the low-complexity transform:
based on the low-complexity transform not being the Hadamard-Walsh transform: decoding the target data block using the generated quantization scheme, or
based on the low-complexity transform being the Hadamard-Walsh transform: (i) adjusting the quantization scheme by performing shifting to compensate for a difference in scaling in large transforms; and (ii) decoding the target data block using the adjusted quantization scheme, wherein the decoding comprises: reverse transforming the target data block to derive a dequantized transform block and up sampling the residual block(s) to an original block size.

6. The method according to claim 1, wherein
the low-complexity transform is the Hadamard-Walsh transform, and
internal rounding operations, which include at least a right shift operation, after horizontal and vertical transform are adjusted accordingly to match scaling of large transforms,
the large transform is a transform that is 64-point or greater.

7. The method according to claim 1, further comprising:
first applying a XxY transform, where X and Y are one of: 2, 4, 8, 16, 32 or 64, on every non-overlapped N×N blocks, where N is a block height, and
subsequently applying thesecond transform on top of the transform coefficients generated by the XxY transform.

8. The method according to claim 1, wherein the at least one of the width and the height of the block size are equal to 128, and, for the 128-point transform, only the first 64, 32, 16, 8, 4, 2 or 1 transform coefficients are used and remaining coefficients are zeroed out.

9. The method according to claim 1, wherein
the subsampling is applied on at least one of: a horizontal direction or a vertical direction, and
the decoding includes a dequantized transform block being reverse transformed and residual blocks being up sampled to an original block size.

10. The method according to claim 9, wherein when a large transform is applied in the at least one of the horizontal direction or the vertical direction, the large transform being a transform that is 64-point or greater, multiples of a smaller block size transform that has a smaller block size than the large transform are applied along the at least one of the horizontal direction or the vertical direction, zero-out is applied for each smaller block size transform, and the results are weighted and summed up to generate the transform coefficients for the whole block and when an inverse large transform needs to be applied in the at least one of the horizontal direction or the vertical direction, the smaller block size transform is applied and then up sampled to MxN to generate the residuals for the whole block, where M is the block width and N is a block height.

11. An apparatus comprising:
at least one memory that stores computer program code; and
at least one processor configured to access the at least one memory and operate according to the computer program code, such that the at least one processor:
receives information regarding a target data block for decoding, wherein the target data block includes at least one of sound or imagery;
identifying whether at least one of a width or a height of a block size of the target data block is greater than or equal to a predetermined threshold, the predetermined threshold being 64 or greater; and
based on the at least one of the width or the height of the block size of the target data block being greater than or equal to the predetermined threshold, performs decoding of the target data block, which includes applying a first transform to a first portion of the target data block, and applying a second transform to a second portion of the target data block, wherein
the second transform is a low-complexity transform that has a size that is less than the predetermined threshold, the second transform is one of: a Hadamard-Walsh transform of which the transform core only consists of 1 and −1, or a predetermined transform of which the transform core only consists of power of 2, the low-complexity transform is scaled accordingly to re-use a same quantization scheme of another transform size that is different than the size of the low-complexity transform, and instead of applying a large transform, which is a transform that is 64-point or greater, the target data block is subsampled by a factor s, and the even samples compose one new block and the odd samples compose another new block.

12. The apparatus according to claim 11, wherein the at least one processor is further configured to execute the computer program code to zero out high frequency transform coefficients so that only lower-frequency transform coefficients are maintained.

13. The apparatus according to claim 11, wherein the at least one processor is further configured to execute the computer program code to scale the low-complexity transform, which includes re-using the same quantization scheme of the other transform size that is different than the size of the low-complexity transform such that an N-point transform core is scaled by 64*sqrt(N) using an orthogonal transform core K which satisfies K*K' is an identify matrix, such that when applying the low-complexity transform, the N-point transform core is scaled by 64*sqrt(N).

14. The apparatus according to claim 11, wherein the at least one processor is further configured to execute the computer program code to:

generate the quantization scheme by scaling the low-complexity transform, and based on the low-complexity transform not being the Hadamard-Walsh transform: decode the target data block using the generated quantization scheme, or based on the low-complexity transform being the Hadamard-Walsh transform: (i) adjust the quantization scheme by performing shifting to compensate for a difference in scaling in large transforms; and (ii) decode the target data block using the adjusted quantization scheme, wherein the decoding comprises: reverse transforming the target data block to derive a dequantized transform block and up sampling the residual block(s) to an original block size.

15. The apparatus according to claim 11, wherein the low-complexity transform is the Hadamard-Walsh transform, and internal rounding operations, which include at least a right shift operation, after horizontal and vertical transform, are adjusted accordingly to match scaling of large transforms.

16. The apparatus according to claim 11, wherein the at least one processor is further configured to execute the computer program code to:

first apply a XxY transform, where X and Y are one of: 2, 4, 8, 16, 32 or 64, on every non-overlapped NxN blocks, where N is a block height, and subsequently apply the second transform on top of the transform coefficients generated by the XxY transform.

17. The apparatus according to claim 11, wherein the at least one of the width or the height of the block size are equal to 128, and, for the 128-point transform, only the first 64, 32, 16, 8, 4, 2 or 1 transform coefficients are used and remaining coefficients are zeroed out.

18. The apparatus according to claim 11, wherein based on a large transform needing to be applied in the at least one of a horizontal direction or a vertical direction, the large transform being a transform that is 64-point or greater, multiples of a smaller block size transform that has a smaller block size than the large transform are applied along the at least one of the horizontal or the vertical direction, zero-out is applied for each smaller block size transform, and the results are weighted and summed up to generate the transform coefficients for the whole block, and based on an inverse large transform needing to be applied in the at least one of the horizontal direction or the vertical direction, the smaller block size transform is applied and then up sampled to MxN to generate the residuals for the whole block, where M is the block width and N is a block height.

19. A non-transitory computer-readable storage medium storing instructions that, when executed, cause one or more processors to:

receive information regarding a target data block for decoding, wherein the target data block includes at least one of sound or imagery;

identify whether at least one of a width or a height of a block size of the target data block is greater than or equal to a predetermined threshold, the predetermined threshold being 64 or greater; and based on the at least one of the width or the height of the block size of the target data block being greater than or equal to the predetermined threshold, perform decoding of the target data block, which includes applying a first transform to a first portion of the target data block, and applying a second transform to a second portion of the target data block, wherein the second transform is a low-complexity transform that has a size that is less than the predetermined threshold, the low-complexity transform is one of: a Hadamard-Walsh transform of which the transform core only consists of 1 and −1, or a predetermined transform of which the transform core only consists of power of 2, the low-complexity transform is scaled accordingly to re-use a same quantization scheme of another transform size that is different than the size of the low-complexity transform, and instead of applying a large transform, which is a transform that is 64-point or greater, the target data block is subsampled by a factor s, and the even samples compose one new block and the odd samples compose another new block.

* * * * *